(12) United States Patent
Shevchenko et al.

(10) Patent No.: US 12,217,287 B2
(45) Date of Patent: Feb. 4, 2025

(54) BRAND ENGINE FOR EXTRACTING AND PRESENTING BRAND DATA WITH USER INTERFACES

(71) Applicant: Intuit Inc., Mountain View, CA (US)

(72) Inventors: Ivan Shevchenko, Lisbon (PT); Tatiana Sukhova, Lisbon (PT)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/129,823

(22) Filed: Mar. 31, 2023

(65) Prior Publication Data

US 2024/0330987 A1    Oct. 3, 2024

(51) Int. Cl.
*G06Q 30/0241* (2023.01)
*G06F 40/106* (2020.01)
*G06F 40/186* (2020.01)

(52) U.S. Cl.
CPC ....... *G06Q 30/0276* (2013.01); *G06F 40/106* (2020.01); *G06F 40/186* (2020.01)

(58) Field of Classification Search
CPC ............ G06Q 30/0276; G06Q 30/0241; G06F 40/186; G06F 40/106
See application file for complete search history.

(56) References Cited

U.S. PATENT DOCUMENTS

| | | | |
|---|---|---|---|
| 2010/0241513 A1* | 9/2010 | Prasad | G06Q 50/184 705/14.69 |
| 2011/0166934 A1* | 7/2011 | Comay | G06Q 30/0255 705/14.53 |
| 2012/0095817 A1* | 4/2012 | Kamil | G11B 27/031 715/202 |
| 2016/0253710 A1* | 9/2016 | Publicover | H04W 4/21 705/14.66 |
| 2019/0012249 A1* | 1/2019 | Mercuri | H04L 63/123 |
| 2019/0066185 A1* | 2/2019 | More | G06N 7/01 |
| 2023/0206261 A1* | 6/2023 | Cella | G06Q 40/04 |
| 2023/0376828 A1* | 11/2023 | Zhao | G06N 3/045 |

* cited by examiner

*Primary Examiner* — Azam A Ansari
(74) *Attorney, Agent, or Firm* — Lathrop GPM LLP

(57) ABSTRACT

A method implements brand engine for extracting and presenting brand data with user interfaces. The method includes receiving a blueprint with a set of structure blocks extracted from a selected content. A structure block of the set of structure blocks includes a set of style parameter requests for a section of the selected content. The method further includes processing the set of structure blocks with a first set of smart blocks to generate a set of scores. A smart block of the first set of smart blocks includes brand data with style parameter selections. The method further includes selecting a second set of smart blocks, for the set of structure blocks, from the first set of smart blocks, using the set of scores. The method further includes presenting the second set of smart blocks with the brand data.

18 Claims, 10 Drawing Sheets

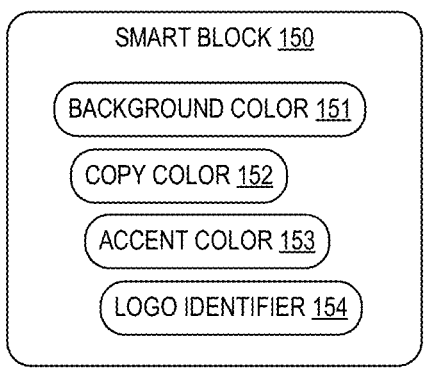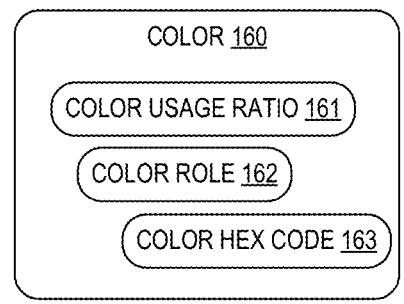
FIGURE 1B
FIGURE 1C

BRAND ENGINE FOR EXTRACTING AND PRESENTING BRAND DATA WITH USER INTERFACES

BACKGROUND

Brand data includes colors, logos, slogans, font properties, etc., and identifies the brand of a company. Brand data is used to distinguish the messages, products, and services of a company from others. Brand data can be used for different types of content and messaging, including web applications, email, electronic messaging, social media, etc. The identification, extraction, and presentation brand data from existing content is a laborious and time-consuming task when performed with common tools. For example, colors and font styles (brand data) may be extracted from a web page by viewing the web page in a browser and copying the values and images from the website to a database. A website editing tool may then be employed to hand edit a website to include the brand data from the database. A challenge is to automatically incorporate a company's brand data into different types of content and messaging.

SUMMARY

In general, in one or more aspects, the disclosure relates to a method implementing a brand engine for extracting and presenting brand data with user interfaces. The method includes receiving a blueprint with a set of structure blocks extracted from a selected content. A structure block of the set of structure blocks includes a set of style parameter requests for a section of the selected content. The method further includes processing the set of structure blocks with a first set of smart blocks to generate a set of scores. A smart block of the first set of smart blocks includes brand data with style parameter selections. The method further includes selecting a second set of smart blocks, for the set of structure blocks, from the first set of smart blocks, using the set of scores. The method further includes presenting the second set of smart blocks with the brand data.

In general, in one or more aspects, the disclosure relates to a system with a processor, a brand engine configured to select a second set of smart blocks, and an application executing the processor servers. The application is configured for receiving a blueprint with a set of structure blocks extracted from a selected content. A structure block of the set of structure blocks includes a set of style parameter requests for a section of the selected content. The application is further configured for processing the set of structure blocks with a first set of smart blocks to generate a set of scores. A smart block of the first set of smart blocks includes brand data with style parameter selections. The application is further configured for selecting, by the brand engine, the second set of smart blocks, for the set of structure blocks, from the first set of smart blocks, using the set of scores. The application is further configured for presenting the second set of smart blocks with the brand data.

In general, in one or more aspects, the disclosure relates to a method of using a brand engine. The method includes transmitting a selected content to a server. The server processes the selected content by extracting a blueprint with a set of structure blocks extracted from a selected content. A structure block of the set of structure blocks includes a set of style parameter requests for a section of the selected content. The server further processes the selected content by processing the processing the set of structure blocks with a first set of smart blocks to generate a set of scores. A smart block of the first set of smart blocks includes brand data with style parameter selections. The server processes the selected content by selecting a second set of smart blocks, for the set of structure blocks, from the first set of smart blocks, using the set of scores. The method further includes displaying a suggested content with the brand data. The suggested content is generated from the second set of smart blocks and received from the server responsive to transmitting the selected content.

Other aspects of the invention will be apparent from the following description and the appended claims.

BRIEF DESCRIPTION OF DRAWINGS

FIG. 1A, FIG. 1B, and FIG. 1C show diagrams of systems in accordance with disclosed embodiments.

DETAILED DESCRIPTION

In general, embodiments automatically incorporate a brand data into different types of content and messaging. The brand data is extracted from content that illustrates the brand. A user may then select content to which the brand data is applied. As an example, the brand data may be automatically scraped from a website into a database. The brand data in the database may then be automatically injected into website editor tool for presentation to a user. Using the system, a user may forego the laborious steps of extraction and injection of brand data to focus on the content being generated.

In one example, a user decides to do an email marketing campaign but is overwhelmed by trying to figure out the brand data to use with the campaign. The user may have illustrative content of past campaigns and of the user's websites. The user engages the system and provides illustrative content (e.g., a webpage) and to select the type of content to generate. The system automatically identifies and extracts the brand data and presents multiple suggestions of branded emails that include the brand data and may be used.

An innovative aspect of the system includes that the branding of the content to be generated is performed by scoring a set of smart blocks. The smart blocks are the brand data extracted from the illustrative content that defines the brand desired by the user. The smart blocks identify properties from the illustrative content, e.g., colors, fonts, images, styles, etc., which represent the brand from the illustrative content. To generate the content, (e.g., an email for a campaign) the smart blocks are scored by the system to determine the brand data to use for the content.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented models and model execution. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1A:
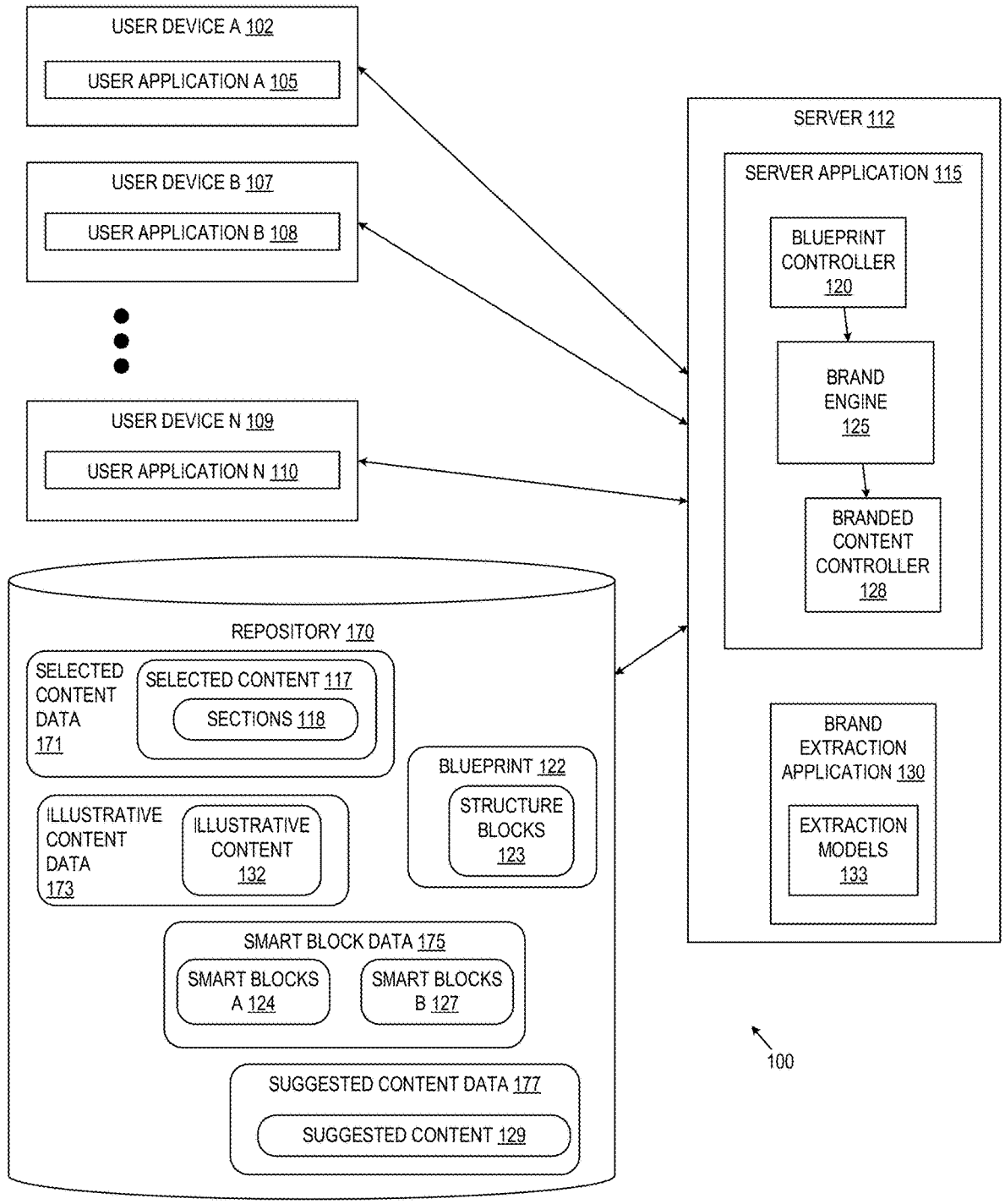

Turning to FIG. 1A, the system (100) brands content using the brand engine (125). The system (100) processes the input (including the selected content (117)) from the user devices A (102) and B (107) through N (109) with the server (112) to generate output (including the suggested content (129)). The system (100) includes the server (112), the user devices A (102) and B (107) through N (109), and the repository (170).

The repository (170) stores data sent through the system (100). For example, the repository (170) includes the selected content data (171), the illustrative content data (173), the smart block data (175), and the suggested content data (177).

The selected content data (171) is data that includes content selected by the users of the system with the user devices A (102) and B (107) through N (109). The selected content data (171) may include templates for email, web pages, social media posts, etc. For example, the selected content data (171) may include the selected content (117).

The selected content (117) is data selected by a user of the system (100) that forms the basis of the suggested content (129). The selected content (117) may be a template for a type of content or may be a piece of content. In one embodiment, the selected content (117) is a template for an email, a landing page, a social media post, an animation, etc. The selected content (117) includes the sections (118).

The sections (118) are portions of the selected content (117). For example, when the selected content (117) is an email template, the sections (118) may include headings, subheadings, interface elements (e.g., buttons), images, etc., from the selected content (117). Each of the sections (118) may have separate style parameters (e.g., colors). For example, the colors of one section may be different from the colors of another section. In one embodiment, the selected content (117) may be text structured according to a standard (e.g., JavaScript object notation (JSON)). When the selected content (117) is a template, each of the sections (118) may include style parameter requests that identify requested style parameters for a section. When the selected content (117) is a piece of content, each of the sections (118) may include style parameter selections that identify style parameters for a section.

The blueprint (122) is data that identifies the style parameter requests for the sections (118) of the selected content (117). In one embodiment, the blueprint (122) is structured text (e.g., JSON text). The blueprint (122) includes the structure blocks (123).

The structure blocks (123) are data that identifies the style parameter requests. One of the structure blocks (123) may correspond to one of the sections (118) of the selected content (117). The structure blocks (123) may be ordered, which may influence the selection of the smart blocks B (127) from the smart blocks A (124). The structure blocks (123) may be structured text with key value pairs to identify the style parameter requests, an example of which is shown using JSON text below.

```
{"section":
  {"type": "heading"
  "backgroundColorRequest": "light",
  "copyColorRequest": "dark",
  "accentColorRequest": "accent"}}
```

The illustrative content data (173) is data that illustrates the brand data of the users of the system. The illustrative content data (173) includes the illustrative content (132), which may be for one of the users of the system (100).

The illustrative content (132) is content that is illustrative of a brand. For example, the illustrative content (132) may be a web page, an email, a social media post, etc. The illustrative content (132) includes style parameter selections (e.g., colors and logo image).

The smart block data (175) is data that encapsulates the brand data of users of the system. The smart block data (175) may include statistical data for the colors associated with the smart blocks of a user. For example, a color usage ratio may be determined for each color that is identified in a smart block for a user. The color usage ratio may identify a percentage of the number of smart blocks for a user that use a specified color. The smart block data (175) may include the smart blocks A (124) and the smart blocks B (127).

The smart blocks A (124) may correspond to a single user of the system (100). The smart blocks A (124) are data that store style parameter selections. The smart blocks A (124) may be a superset of the smart blocks B (127). In one embodiment, the style parameter selections identify the colors used in a section of content and a logo image. In one embodiment, the smart blocks A (124) are structured text (e.g., JSON text) that includes color values. In one embodiment, each of the smart blocks A (124) identifies a logo image to which the smart block corresponds and with which the smart block is compatible. Compatibility is determined by the color selections that do not conflict with the logo image. For example, a logo image that uses dark colors may not be compatible with dark background colors that do not provide sufficient contrast between the background and the logo image.

A color value in smart block may be formatted as a string that identifies or maps to a specific color value of a color space. The color space may default to the RGB (red, green, blue) color space, which includes separate values for red, green, and blue colors. For example, the color red may be coded as "0xFF0000" to which the string value "red" may be mapped.

The smart blocks B (127) are data that identify style parameter selections for the sections (118). The smart blocks B (127) may be a subset of the smart blocks A (124) selected to correspond to the sections (118). One of the smart blocks A (124) may be used multiple times in the smart blocks B (127).

The suggested content data (177) is data to which the smart block data (175) is applied. For example, the suggested content data (177) includes the suggested content (129), which is based on the application of the smart blocks B (127) to the selected content (117).

The suggested content (129) is a version of the selected content (117) to which the style selection parameters of the smart blocks B (127) have been applied. In one embodiment, the suggested content (129) may be an email generated from an email template (e.g., the selected content (117)) with colors identified by the smart blocks B (127).

In one embodiment, the suggested content (129) may be a revised email template that includes style parameter selections from the smart blocks B (127) into which additional content may added. For example, the selected content (117) may be an email template and the suggested content (129) may also be an email template (displayed with the colors from the smart blocks B (127)) and the user may add additional content (e.g., text) to the suggested content (129).

Figure 6A:
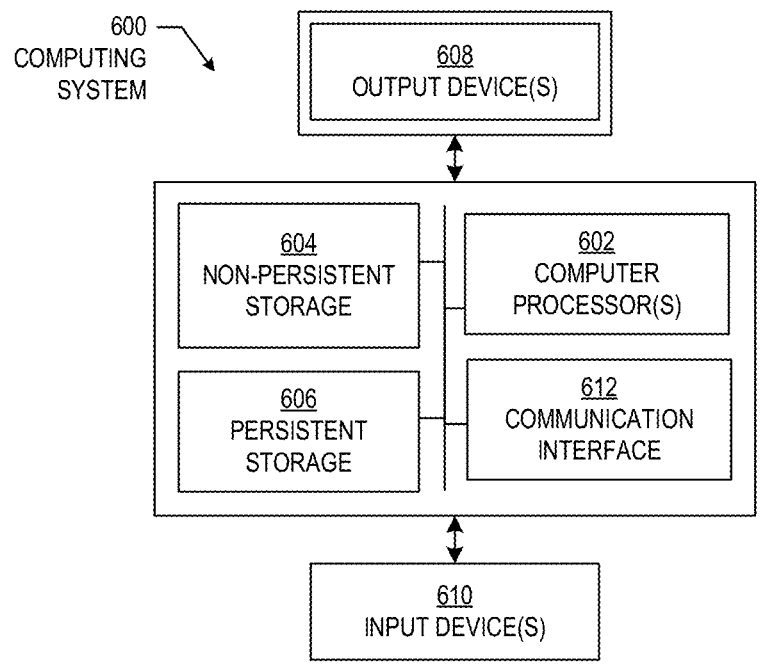
FIG. 6A and FIG. 6B show computing systems in accordance with disclosed embodiments.

The server (112) is a computing system (further described in FIG. 6A). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) may include the server application (115) and the brand extraction application (130).

The server application (115) is a collection of hardware and software components that include programs with instructions that may execute on multiple servers of a cloud environment, including the server (112). The server application (115) processes the selected content (117) to generate the suggested content (129) using the smart blocks A (124). In one embodiment, the server application (115) hosts websites and may serve structured documents (hypertext markup language (HTML) pages, extensible markup language (XML) pages, JavaScript object notation (JSON) files and messages, etc.) to interact with the user devices A (102) and B (107) through N (109). Requests from the user devices A (102) and B (107) through N (109) may be processed that include the selected content (117). The suggested content (129) may be included in responses, to the requests, that are returned to the user devices A (102) and B (107) through N (109). The server application (115) may include the blueprint controller (120), the brand engine (125), and the branded content controller (128).

The blueprint controller (120) is a collection of hardware and software components that include programs with instructions that may operate on the server (112). The blueprint controller (120) processes the selected content (117) to generate the blueprint (122).

The brand engine (125) is a collection of hardware and software components that include programs with instructions that may operate on the server (112). The brand engine (125) processes the structure blocks (123) from the blueprint (122) to select the smart blocks B (127) from the smart blocks A (124) for the suggested content (129). In one embodiment, the brand engine (125) selects the smart blocks B (127) from the smart blocks A (124) by scoring the smart blocks A (124) against the structure blocks (123). For example, the smart block (from the smart blocks A (124)) with the highest score for a structure block (from the structure blocks 123)) may be included in the smart blocks B (127). The scoring may be incremental based on the properties of a smart block that match to a structure block. For example, when a structure block includes a property indicating that a white foreground color is to be used, the scores of the smart blocks with properties including a white foreground color may be increased (e.g., by "1"). After processing the properties of the structure block to adjust the scores of the smart blocks A (124), the smart block with the highest score may be added to the smart blocks B (127).

The branded content controller (128) is a collection of hardware and software components that include programs with instructions that may operate on the server (112). The branded content controller (128) processes the selected content (117) with the smart blocks B (127) to generate the suggested content (129).

The brand extraction application (130) is a collection of hardware and software components that include programs with instructions that may execute on multiple servers of a cloud environment, including the server (112). The brand extraction application (130) extracts brand data (e.g., the smart blocks A (124)) from content that illustrates a brand (e.g., the illustrative content (132)).

The extraction models (133) are collections of hardware and software components that include programs with instructions that may operate on the server (112). The extraction models (133) process the illustrative content (132) to generate the smart blocks A (124). Different ones of the extraction models (133) may be used to extract different types of data.

The user devices A (102) and B (107) through N (109) are computing systems (further described in FIG. 6A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used to send a message that identifies the selected content (117) to the server (112). The selected content (117) is processed by the system (100) to generate the suggested content (129), which may be transmitted to the user application A (105) as part of a response. The response and the suggested content (129) may be presented to and displayed by the user application A (105).

The repository (170) is a computing system that may include multiple computing devices in accordance with the computing system (500) and the nodes (522) and (524) described below in FIGS. 5A and 5B. The repository (170) may be hosted by a cloud services provider that also hosts the server (112). The cloud services provider may provide hosting, virtualization, and data storage services as well as other cloud services to operate and control the data, programs, and applications that store and retrieve data from the repository (170). The data in the repository (170) includes the selected content data (171), the illustrative content data (173), the smart block data (175), and the suggested content data (177).

Turning to FIG. 1B, the smart block (150) is one of the smart blocks A (124) of FIG. 1A. The smart block (150) includes the background color (151), the copy color (152), the accent color (153), and the logo identifier (154).

The background color (151) is a color for a background. For example, the background color (151) may identify the background color for one of the sections (118) of FIG. 1A.

The copy color (152) is a color for a section of content. The copy color (152) may be used as the color of a font for text in a section.

The accent color (153) is a color for a section of content. In one embodiment, the accent color (153) may be used as the color for a button of an email.

The logo identifier (154) is an identifier that identifies a logo image to which the smart block (150) is compatible. The logo identifier (154) may be in the form of a uniform resource locator (URL). In one embodiment, the logo identifier (154) may include the logo image or a hash of the logo image as the identifier.

The example below is structured text (e.g., JSON text) that may define a smart block. The structured text of the smart block identifies multiple colors and a logo image.

```
{"smartBlock":
    {"type": "heading"
    "backgroundColor": "white",
    "copyColor": "0x000000",
    "accentColor": "0xFF0000"
    "logoImage": "domain.name/image"}}
```

Turning to FIG. 1C, the color (160) contains information about the colors used by the system for the users of the system. The color (160) includes the color usage ratio (161), the color role (162), and the color hex code (163).

The color usage ratio (161) identifies a ratio of the use of a color. In one embodiment, the color usage ratio (161) identifies a percentage number of smart blocks for a given user that use the color (160).

The color role (162) identifies a role of a color. The role of a color may be stored as a text string with multiple words that describe the role. For example, the color role (162) for the color (160) may include the string "impact*flashy*strong", which indicates that the color is appropriate for content that creates an impact, is flashy, or is strong.

The color hex code (163) identifies the value of a color. In one embodiment, the color hex code (163) is a string of hex characters that identify the color in an RGB color space. For example, the string "0x00FF00" identifies the color green.

Figure 2:
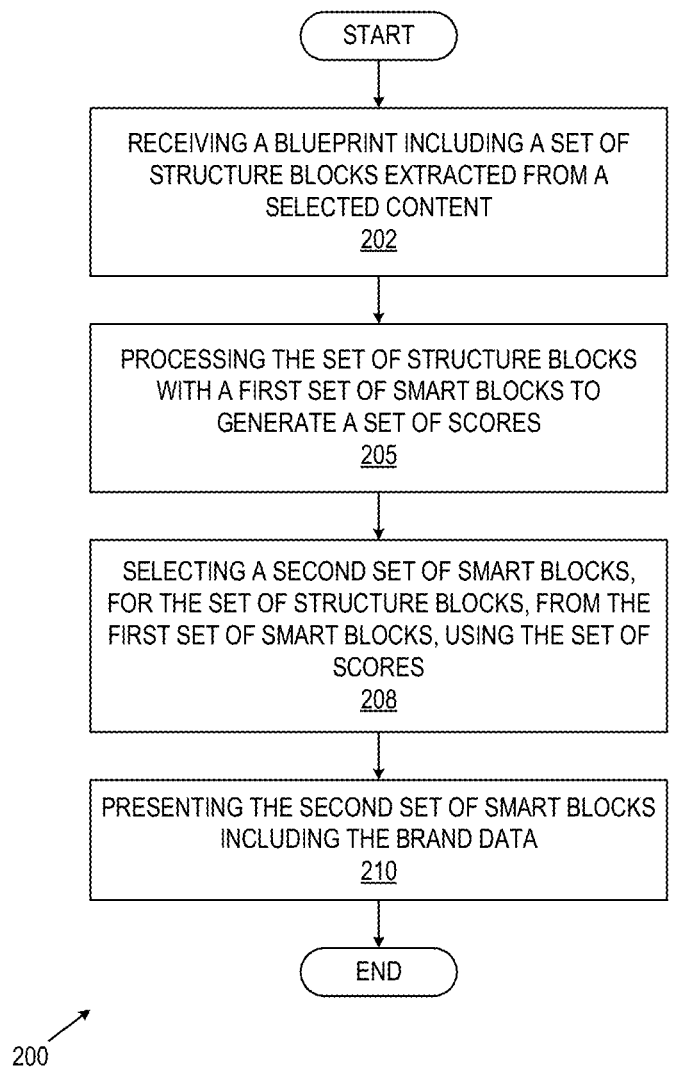
FIG. 2 shows a flowchart in accordance with disclosed embodiments.

Turning to FIG. 2, the process (200) incorporates brand data into different types of content. The process (200) may be performed by a computing device interacting with one or more additional computing devices. For example, the process (200) may execute on a server response to one or more user devices.

In one embodiment, a set of illustrative content is processed with a set of extraction models to generate a first set of smart blocks. For example, a web page, an email, a social media post, etc., may be identified as illustrative content. The system may scrape styles, including colors, from the illustrative content.

At Step 202, a blueprint is received that includes a set of structure blocks extracted from a selected content. The structure block of the set of structure blocks includes a set of style parameter requests for a section of the selected content. In one embodiment, the blueprint is generated by extracting a set of structure blocks from the selected content. For example, the selected content may be a template persisted as structured text that includes the text of the structure blocks within the structured text of the template.

In one embodiment, the blueprint is formed by processing the selected content to extract the set of structure blocks from the selected content as an ordered set. For example, the selected content may be an email and a set of structured blocks may be created that correspond to the sections of the email and use the ordering of the sections of the email.

In one embodiment, a section of the selected content corresponds to one of a heading, a subheading, an interaction button, and a logo image. The heading may include large text. The subheading may include normal text. The interaction button may be used to prompt the eventual recipient of the email to take an action with the email (e.g., to open a web page). The logo image may be an image or an identifier for the location of the logo image.

In one embodiment, the structure blocks of the blueprint may include multiple style parameter requests, which may be of different types. In one embodiment, a tone parameter request, of the style parameter requests, identifies a requested tone parameter as one of "white", "light", "dark", and "accent". A "light" tone parameter request may be used to filter for smart blocks with light colors. A light color may include colors with an equivalent lightness value in the HSL (hue, saturation, and lightness) color space of 0.7 or greater. In one embodiment, a "dark" color may be colors with a lightness in the HSL color space of 0.3 or lower.

In one embodiment, a role parameter request of the set of style parameter requests identifies a role parameter with a string of words joined with a separator character. For example, a role parameter request may include the string "impact*bold", which can be matched to smart blocks with colors identified with one or more of the same words (i.e., "impact" or "bold").

In one embodiment, a usage parameter request of the set of style parameter requests identifies a usage parameter as one of "max" and "min". A "max" usage parameter in a structure block may match to a color that has a usage ratio with the largest value of the set of usage ratios for the colors used in the illustrative content of a user. A "min" usage parameter in a structure block may match to a color that has a usage ratio with the lowest value of the set of usage ratios for the colors used in the illustrative content of a user.

In one embodiment, a same-as parameter request of the set of style parameter requests identifies a same-as parameter that identifies a previous block from the set of structured blocks. The same-as parameter request may be used to have two blocks, in the set of structure blocks, have the same style parameters.

At Step 205, the set of structure blocks is processed with a first set of smart blocks to generate a set of scores. The smart blocks may include brand data with style parameter selections that are compared to the style parameter requests of the structure blocks. In one embodiment, for each style parameter request of a structure block that matches the style parameter selection of a smart block, the score of the smart block is incremented by "1". For example, when a structure block includes style parameter requests for a white background color and dark copy color, then a smart block with style parameter selections that matches both requests would have a score increased by "2" and a smart block that matches one of the requests would have a score increased by "1".

In one embodiment, a rule of the set of rules for processing the structure blocks prevents two consecutive blocks, from the set of structure blocks, from being matched to the same smart block. Preventing two consecutive blocks from matching to the same smart block may prevent adjacent sections of content from have the same style (e.g., colors) and allows the different sections to be visually differentiated (e.g., with different colors).

At Step 208, a second set of smart blocks, for the set of structure blocks, is selected from the first set of smart blocks, using the set of scores. In one embodiment, the smart block, from the first set of smart blocks, with the largest score is selected as the smart block that matches to the structure block being processed. A smart block may be matched to multiple structure blocks.

At Step 210, the second set of smart blocks is presented with the brand data of a user. In one embodiment, the second set of smart blocks may be presented by generating suggested content from the second set of smart blocks (in combination with the selected content) and transmitting the suggested content to a user device. The user device may display the suggested content generated using the second set of smart blocks. The suggested content includes the brand data of the user and may be displayed with the colors that are associated with the brand of the user and identified by the smart blocks.

In one embodiment, the selected content is one of an email template and an email. The suggested content that is generated from the selected content and the second set of smart blocks is an email that includes the brand data. The email may be used as part of an email marketing campaign.

Figure 3A:
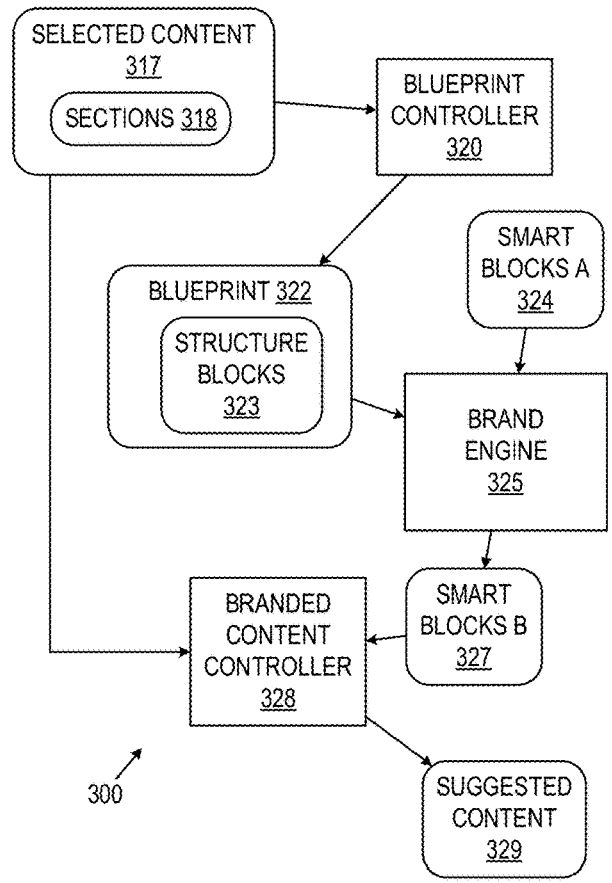
FIG. 3A, FIG. 3B, FIG. 4A, FIG. 4B, FIG. 5A, FIG. 5B, FIG. 5C, and FIG. 5D show examples in accordance with disclosed embodiments.

Turning to FIG. 3A, the sequence (300) illustrates a flow of data through the components of a system. For example, the sequence (300) may execute as part of the server application (115) of FIG. 1A. The selected content (317) (which includes the sections (318)) is an input to the blueprint controller (320), which outputs the blueprint (322) (which includes the structure blocks (323). The blueprint (322) and the smart blocks A are inputs to the brand engine (325), which outputs the smart blocks B (327). The smart blocks B (327) and the selected content (317) are inputs to the branded content controller (328), which outputs the suggested content (329).

The selected content (317) is data selected by a user of the system (300) that forms the basis of the suggested content (329). The selected content (317) may be a template for an email, a landing page, a social media post, an animation, etc. The selected content (317) includes the sections (318).

The sections (318) are portions of the selected content (317). For example, when the selected content (317) is an email template, the sections (318) may include headings, subheadings, interface elements (e.g., buttons), images, etc., from the selected content (317). The sections (318) form the selected content (317), which is input to the blueprint controller (320).

The blueprint controller (320) processes the selected content (317) to generate the blueprint (322). In one embodiment, the blueprint controller (320) extracts style parameter requests from the sections (318) to form the structure blocks (323) of the blueprint (322). In one embodiment, the blueprint controller (320) processes the sections (318) to identify the style parameters selections and generate the structure blocks (323) of the blueprint (322).

The blueprint (322) is data that identifies the style parameter requests for the sections (318) of the selected content (317). The blueprint (322) includes the structure blocks (323).

The structure blocks (323) identify the style parameter requests. One of the structure blocks (323) may correspond to one of the sections (318) of the selected content (317). The structure blocks (323) may be ordered, which may influence the selection of the smart blocks B (327) from the smart blocks A (324). The structure blocks (323) are part of the blueprint (322), which is one of the inputs to the brand engine (325) along with the smart blocks A (324).

The smart blocks A (324) are data that store style parameter selections. The smart blocks A (324) may be a superset of the smart blocks B (327). In one embodiment, the style parameter selections identify the colors used in a section of content and a logo image. The smart blocks A (324), along with the blueprint (322) are inputs to the brand engine (325).

The brand engine (325) processes the structure blocks (323) from the blueprint (322) to select the smart blocks B (327) from the smart blocks A (324) for the suggested content (329). Each of the smart blocks B (327) include style parameter selections. In one embodiment, the brand engine (325) scores the smart blocks A (324) based on the style parameter requests of the structure blocks (323) and the style parameter selections of the smart blocks A (324) to select the smart blocks B (327) from the smart blocks A (324). Additionally, the order of the structure blocks (323) may influence the selection of the smart blocks B (327) from the smart blocks A (324).

The smart blocks B (327) are data that identify style parameter selections for the sections (318). The smart blocks B (327) may be a subset of the smart blocks A (324) selected to correspond to the sections (318).

The branded content controller (328) is a collection of hardware and software components that include programs with instructions that may operate on the server (312). The branded content controller (328) processes the selected content (317) with the smart blocks B (327) to generate the suggested content (329).

The suggested content (329) is a version of the selected content (317) to which the style selection parameters of the smart blocks B (327) have been applied.

Figure 3B:
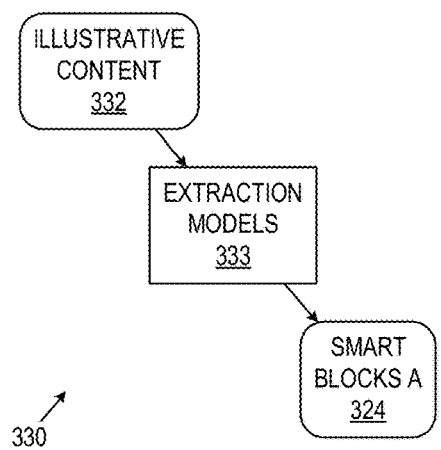

Turning to FIG. 3B, the sequence (330) illustrates a flow of data through the components of a system. For example, the sequence (330) may execute as part of the brand extraction application (130) of FIG. 1A. The illustrative content (332) is an input to the extraction models (333), which output the smart blocks A (324).

The illustrative content (332) is content that is illustrative of a brand. For example, the illustrative content (332) may be a web page, an email, a social media post, etc. The illustrative content (332) includes style parameter selections (e.g., colors and logo image). The illustrative content (332) is identified by a user and input to the extraction models (333).

The extraction models (333) process the illustrative content (332) to generate the smart blocks A (324). Different ones of the extraction models (333) may be used to extract different types of data. For example, one of the extraction models (333) may be used to identify a background color and a different one of the extraction models (333) may be used to extract a logo image. The extraction models (333) may also generate statistical data from the illustrative content (332) that identifies the likelihoods that particular style parameter selections are used and are used together. For example, the statistical data may identify the likelihood that a particular logo image is used with a particular background color.

The smart blocks A (324) are data that store the style parameter selections extracted from the illustrative content (332). The smart blocks A (324) are generated by the extraction models (333) from the illustrative content (332).

Figure 4A:
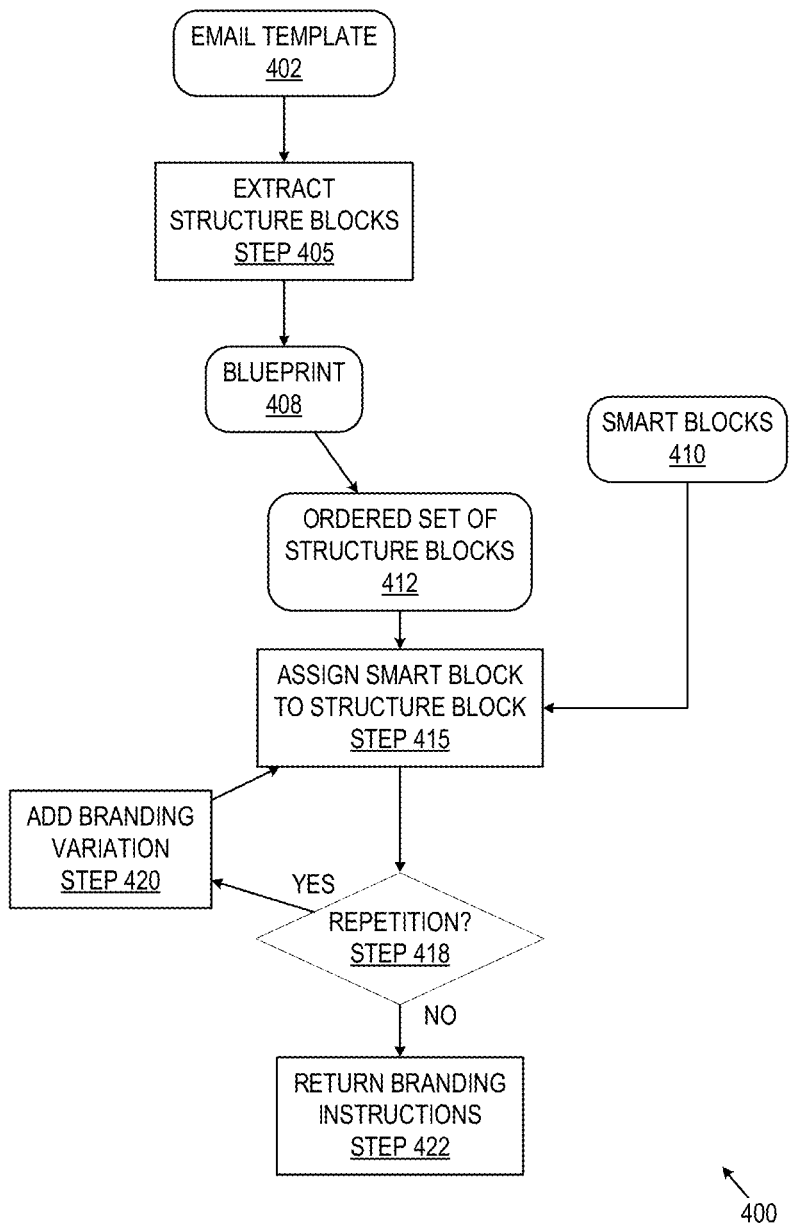

Turning to FIG. 4A, the process (400) is an example of a method that may be used to incorporate brand data an email. The process (400) may be performed by a computing device interacting with one or more additional computing devices. For example, the process (400) may execute on a server response to one or more user devices.

By way of an example, consider the scenario in which a user decides to create an email campaign for the user's company's new product line. and selects the email template (402) with a user device, which transmits the selection to a server.

At Step 405, the email template (402) is processed to extract structure blocks for the blueprint (408). In one embodiment, the email template (402) includes sections that include style parameter requests. The style parameter requests are extracted from the sections of the email template (402) to generate the structure blocks that form the blueprint (408).

The blueprint (408) is a container of the structure blocks extracted from the email template (402). The order of the structure blocks in the blueprint (408) maintains the order of the sections from within the email template (402).

The smart blocks (410) contain the brand data. The user has previously identified the user's company's website as content that is illustrative of the brand to project for the user's company. The system processed the illustrative content (the user's company's website) and generated the smart blocks (410).

The structure blocks (412) are an ordered set of blocks. The order of the structure blocks (412) is the same as the order of the sections of the email template 302. The structure blocks (412) may be extracted from the blueprint (408) to be processed by the system.

At Step 415, one of the smart blocks (410) is assigned to each of the structure blocks (412). The system may process the structure blocks (412) in the order of the structure blocks (412). Each of the smart blocks (410) may be scored and the smart blocks (410) with the highest score may be selected to be assigned to a structure block. Assignment of a smart block to a structure block may be performed by creating a link from the structure block to the smart block. A method for Step 415 is further described with FIG. 4B.

At Step 418, a determination is made to identify if the smart block assigned to the structure block currently being processed is the same as the smart block assigned to the previous structure block, which is referred to as a repetition. The previous structure block may be the immediately previous structure block.

At Step 420, when there is a repetition of smart blocks assigned to consecutive structure blocks, branding variation is added. In one embodiment, the smart block with the second highest score (as determined in Step 415) may be assigned to the structure block. Checking for the repetition of smart blocks may be prevented by using the "same-as" style parameter request.

At Step 422, branding instructions are returned. The branding instructions identify the styles (e.g., colors) to use for the sections of the email template (402). The branding instructions may be returned by generating a list of links between the structure blocks (412) and the smart blocks (410) and transmitting the list to a process that initiated Step 415.

Figure 4B:
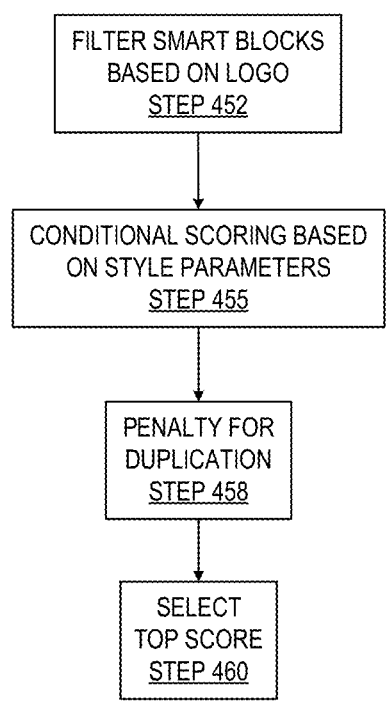

Turning to FIG. 4B, the process (415) may implement the Step 415 of FIG. 4A. The process (415) may execute on the computing system that executed the process (400) of FIG. 4A.

At Step 452, smart blocks are filtered based on logo. The current structure block being analyzed may include a style parameter request that identifies a particular logo (e.g., black logo on white background). The list candidate smart blocks for the current structure block are filtered to remove smart blocks that do not identify the same logo as that requested in the structure block.

At Step 455, conditional scoring based on style parameters is performed. For example, if a requested background color matches the background color selection of a smart block, the score of the smart block is incremented. Each of the different types of colors may be conditionally processed in a similar fashion.

At Step 458, a penalty is applied for duplication. If a smart block for the structure block currently being processed is the same as the smart block assigned to the previous processed structure block, the score of the smart block for the structure block currently being processed may be reduced by the amount of the penalty (e.g., "2"). The penalty for duplication may be avoided by using the "same-as" style property request.

At Step 460, a top score is selected. In one embodiment, the top score is the score of the smart blocks with the largest value.

FIGS. 5A through 5D show the user interfaces (500) through (550) that may execute on a user device operated by a user and connected to a system to use a brand engine to incorporate brand data into content. In one embodiment, the user device may be a mobile device or a desktop computing.

Figure 5A:
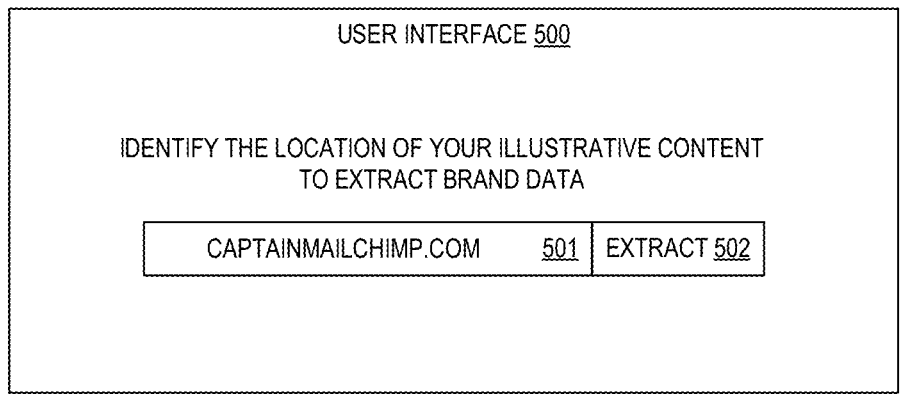

Turning to FIG. 5A, the user interface (500) is used to collect information. The user identifies the location of the illustrative content as the website "website.com" using the text box (501). Selecting the button (502) sends the illustrative content (the URL for the website) to a server for processing to extract brand data from the illustrative content. Additional pieces of illustrative content may be identified using the text box (501) and the button (502). Multiple smart blocks may be generated for each piece of illustrative content and may correspond to different sections of the illustrative content.

Figure 5B:
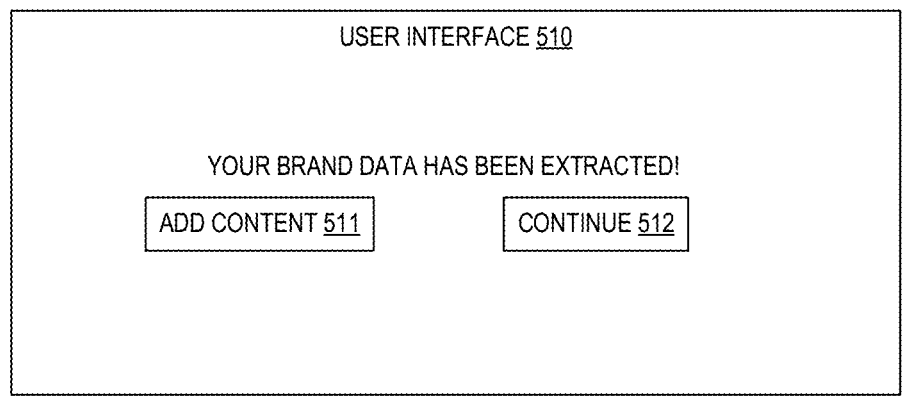

Turning to FIG. 5B, the user interface (510) is displayed after extracting the brand data. The brand data is extracted as a set of smart blocks from the illustrative content (e.g., the website "website.com") identified with the user interface (500) of FIG. 5A. The button (511) may be selected to return to the user interface (500) of FIG. 5A and identify additional illustrative content. The button (512) may be selected to continue to the user interface (520) of FIG. 5C.

Figure 5C:
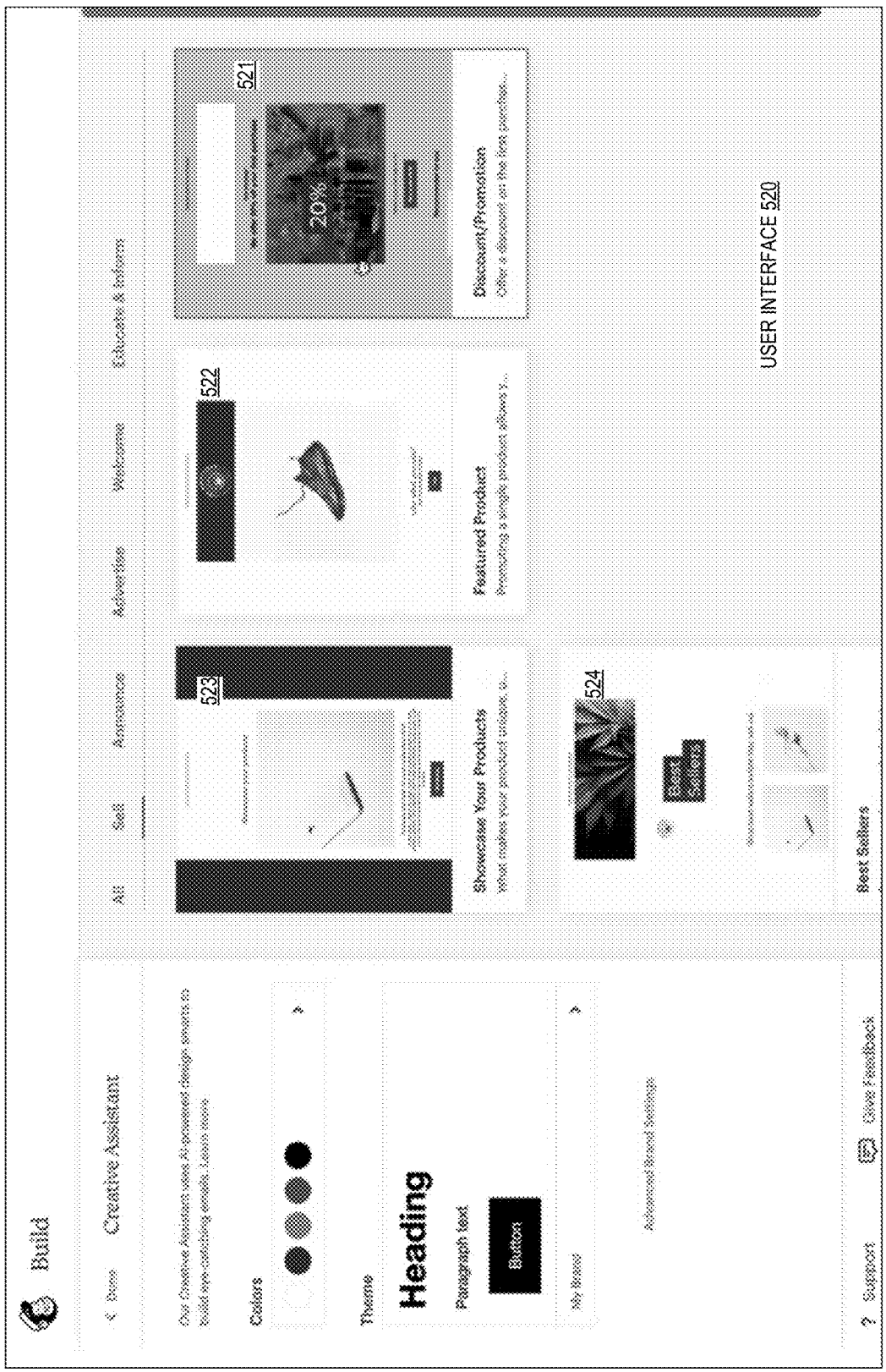

Turning to FIG. 5C, the user interface (520) presents multiple suggested contents (521) through (524) to use for an email campaign. Each of the suggested contents (521) through (524) are shown as a preview that incorporates brand data extracted from illustrative content. The user is interested in and selects the suggested content (521) to proceed to the user interface (550) of FIG. 5D.

Figure 5D:
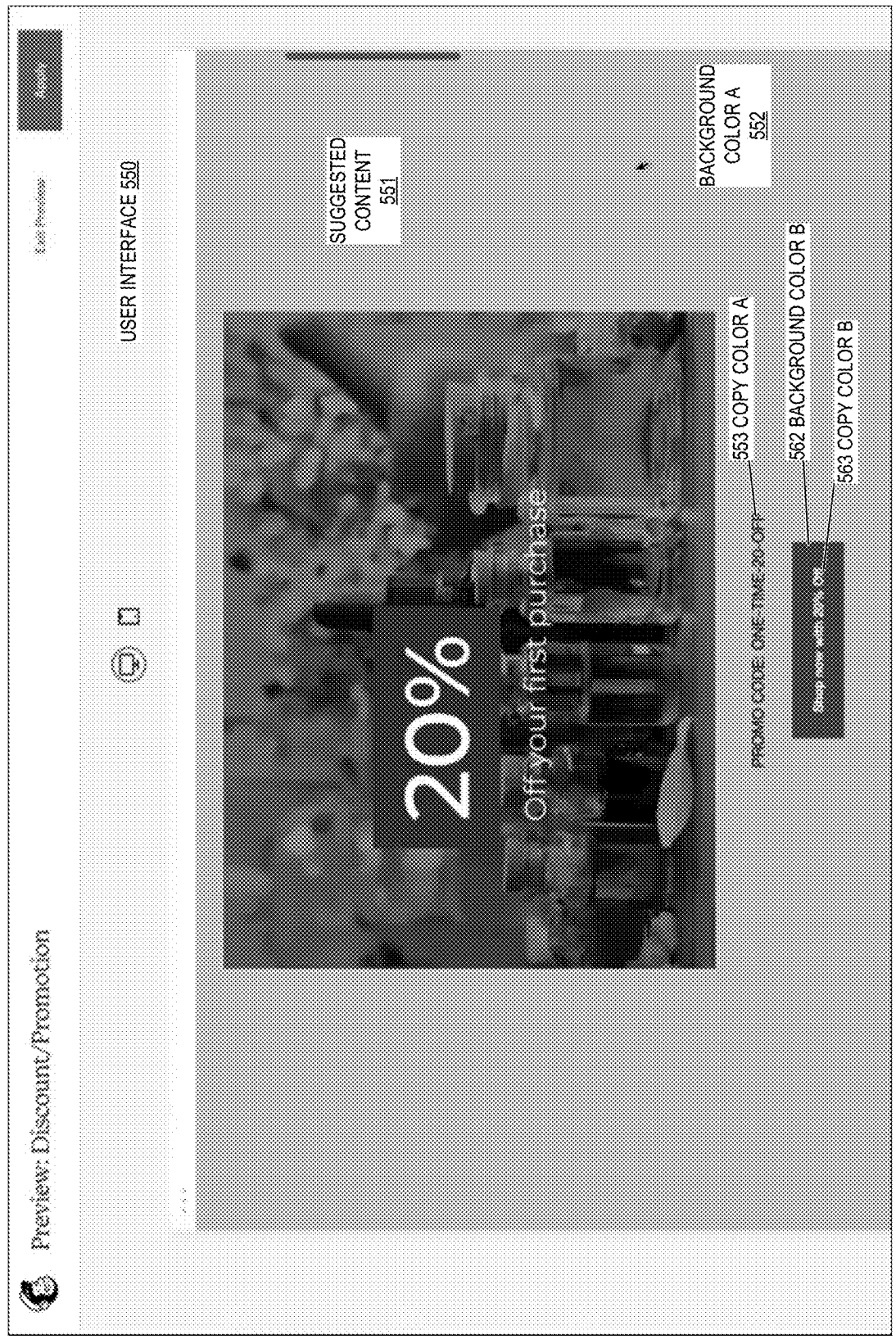

Turning to FIG. 5D, the user interface (550) displays the suggested content (551). The suggested content (551) is a version of the suggested content (521) (from FIG. 5C) that is editable by the user. The suggested content (551) is a template for an email that may be used for a mass marketing campaign. The suggested content (551) includes the background color A (552), the copy color A (553), the background color B (562), and the copy color B (563).

The background color A (552) and the copy color A (553) correspond to a smart block with colors extracted for a section from illustrative content. The background color B (562) and the copy color B (563) correspond to a smart block with different colors that were extracted from for a different section of the illustrative content. Seeing the suggested content (551), the user is excited to see from the website applied to the email for the marketing campaign.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (608). The inputs may include text input, audio input, video input, etc., which may be processed and transmitted by the computing system (600) in accordance with the disclosure. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output device(s) (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output device(s) (608) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 6B:
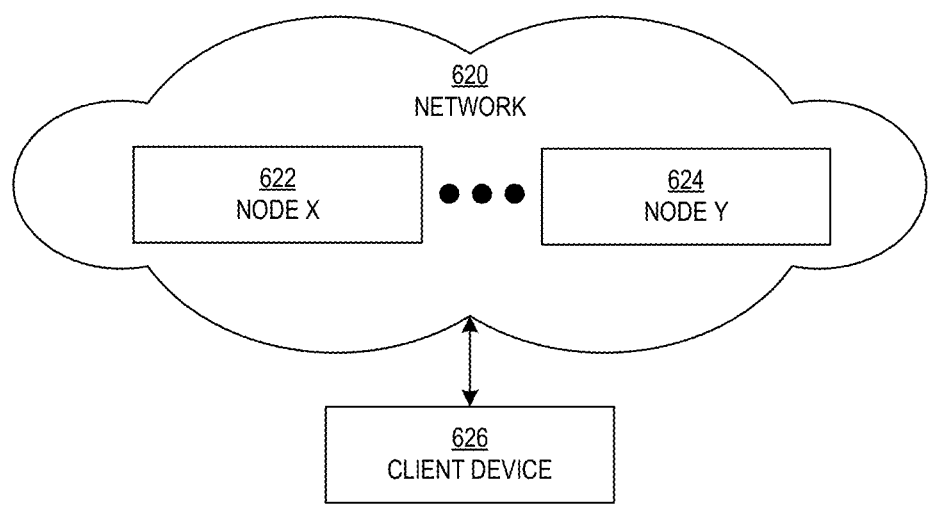

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method, comprising:
receiving, from a user interface of a computing system, a request to automatically generate a structured language electronic communication from a selected content, wherein the selected content comprises a selected template for the structured language electronic communication, and wherein the selected content comprises a plurality of sections;

receiving, from the user interface, a selection of a remote data source, wherein the remote data source stores an illustrative content;

extracting, from the remote data source, the illustrative content;

generating a plurality of structure blocks comprising structured text data structures comprising key-value pairs defined in computer-readable program code, wherein generating further comprises converting the illustrative content into a plurality of smart blocks comprising structured text computer-readable data structures that store brand data with style parameter selections extracted from the illustrative content, and wherein the style parameter selections identify a plurality of colors used in a section of the illustrative content;

generating a blueprint by extracting a subset of the plurality of structure blocks from the selected content, the blueprint comprising a structured text computer readable data structure storing data that identifies a set of style parameter requests for the plurality of sections of the selected content, wherein the structured text computer readable data structure comprises a JSON data structure that defines color values of selected colors, selected from the plurality of colors, for the set of the set of style parameter requests;

processing the blueprint against a first set of the plurality of smart blocks to generate, based on the color values, a set of scores for the smart blocks, wherein the processing comprises comparing the brand data to the set of style parameter requests of the plurality of structure blocks to generate the set of scores according to a degree of match between the brand data and the color values for the set of style parameter requests;

selecting a second set of smart blocks, from the subset of the plurality of structure blocks, from the plurality of smart blocks, using the set of scores, wherein the second set of smart blocks include a selected parameter style request having a selected color among the selected colors;

extracting, into a structured document defined in computer program code, suggested content from the second set of smart blocks by extracting a corresponding color value, from among the color values, for the selected color into the structured document; and generating the structured language electronic communication by combining the selected content in the selected template with the structured document, the structured document including the corresponding color value.

2. The method of claim 1, further comprising:
transmitting the structured language electronic communication over a network to a user device.

3. The method of claim 1, further comprising:
processing a set of the illustrative content with a set of extraction models to generate the first set of smart blocks.

4. The method of claim 1, wherein the selected content is one of an email template, an email, a landing page, a social media template, an animation.

5. The method of claim 1,
wherein a tone parameter request of the set of style parameter requests identifies a tone parameter as one of "white", "light", "dark", and "accent";
wherein a role parameter request of the set of style parameter requests identifies a role parameter with a string of words joined with a separator character;
wherein a usage parameter request of the set of style parameter requests identifies a usage parameter as one of "max" and "min"; and
wherein a same-as parameter request of the set of style parameter requests identifies a same-as parameter that identifies a previous block from the plurality of structure blocks.

6. The method of claim 1, wherein the plurality of sections comprises at least one of a heading, a subheading, an interaction button, and a logo image.

7. The method of claim 1, further comprising:
processing the plurality of structure blocks blueprint by incrementing the set of scores when at least one style parameter request of the subset of the plurality of structure blocks matches a style parameter selection of at least one of the plurality of smart blocks.

8. The method of claim 1, further comprising:
processing the plurality of structure blocks blueprint with a set of rules, wherein a rule of the set of rule prevents two consecutive blocks from the subset of the plurality of structure blocks from being matched to one smart block from the first set of smart blocks.

9. The method of claim 1, further comprising:
presenting the second set of smart blocks, wherein the selected content is one of an email template and an email and wherein the suggested content generated from the selected content and the second set of smart blocks is another email comprising the brand data.

10. A system comprising:
a processor;
a brand engine configured to select a second set of smart blocks; and
an application executing on the processor and configured for:
receiving, from a user interface of a computing system, a request to automatically generate a structured language electronic communication from a selected content, wherein the selected content comprises a selected template for the structured language electronic communication, and wherein the selected content comprises a plurality of sections;

receiving, from the user interface, a selection of a remote data source, wherein the remote data source stores an illustrative content;

extracting, from the remote data source, the illustrative content;

generating a plurality of structure blocks comprising structured text data structures comprising key-value pairs defined in computer-readable program code, wherein generating further comprises converting the illustrative content into a plurality of smart blocks comprising structured text computer-readable data structures that store brand data with style parameter selections extracted from the illustrative content, and wherein the style parameter selections identify a plurality of colors used in a section of the illustrative content;

generating a blueprint by extracting a subset of the plurality of structure blocks from the selected content, the blueprint comprising a structured text computer readable data structure storing data that identifies a set of style parameter requests for the plurality of sections of the selected content, wherein the structured text computer readable data structure comprises a JSON data structure that defines color values of selected colors, selected from the plurality of colors, for the set of the set of style parameter requests;

processing the blueprint against a first set of the plurality of smart blocks to generate, based on the color values, a set of scores for the smart blocks, wherein the processing comprises comparing the brand data to the set of style parameter requests of the plurality of structure blocks to generate the set of scores according to a degree of match between the brand data and the color values for the set of style parameter requests;

selecting the second set of smart blocks, from the subset of the plurality of structure blocks, from the plurality of smart blocks, using the set of scores, wherein the second set of smart blocks include a selected parameter style request having a selected color among the selected colors;

extracting, into a structured document defined in computer program code, suggested content from the second set of smart blocks by extracting a corresponding color value, from among the color values, for the selected color into the structured document; and generating the structured language electronic communication by combining the selected content in the selected template with the structured document, the structured document including the corresponding color value.

11. The system of claim 10, wherein the application is further configured for:
transmitting the structured language electronic communication over a network to a user device.

12. The system of claim 10, wherein the application is further configured for:
processing a set of the illustrative content with a set of extraction models to generate the first set of smart blocks.

13. The system of claim 10, wherein the application is further configured for: processing the selected content to extract the plurality of structure blocks from the selected content, wherein the selected content is one of an email template, an email, a landing page, a social media template, an animation.

14. The system of claim 10,
wherein a tone parameter request of the set of style parameter requests identifies a tone parameter as one of "white", "light", "dark", and "accent";
wherein a role parameter request of the set of style parameter requests identifies a role parameter with a string of words joined with a separator character;
wherein a usage parameter request of the set of style parameter requests identifies a usage parameter as one of "max" and "min"; and
wherein a same-as parameter request of the set of style parameter requests identifies a same-as parameter that identifies a previous block from the plurality of structure blocks.

15. The system of claim 10, wherein the plurality of sections comprises at least one of a heading, a subheading, an interaction button, and a logo image.

16. The system of claim 10, wherein the application is further configured for:
processing the plurality of structure blocks blueprint by incrementing the set of scores when at least one style parameter request of the subset of the plurality of structure blocks matches a style parameter selection of at least one of the plurality of smart blocks.

17. The system of claim 10, wherein the application is further configured for:
processing the plurality of structure blocks blueprint with a set of rules, wherein a rule of the set of rule prevents two consecutive blocks from the subset of the plurality of structure blocks from being matched to one smart block from the first set of smart blocks.

18. A method comprising:
transmitting a selected content to a server, wherein the server processes the selected content by:
receiving, from a user interface of a computing system, a request to automatically generate a structured language electronic communication from the selected content, wherein the selected content comprises a selected template for the structured language electronic communication, and wherein the selected content comprises a plurality of sections;

receiving, from the user interface, a selection of a remote data source, wherein the remote data source stores an illustrative content;

extracting, from the remote data source, the illustrative content;

generating a plurality of structure blocks comprising structured text data structures comprising key-value pairs defined in computer-readable program code, wherein generating further comprises converting the illustrative content into a plurality of smart blocks comprising structured text computer-readable data structures that store brand data with style parameter selections extracted from the illustrative content, and wherein the style parameter selections identify a plurality of colors used in a section of the illustrative content;

generating a blueprint by extracting a subset of the plurality of structure blocks from the selected content, the blueprint comprising a structured text computer readable data structure storing data that identifies a set of style parameter requests for the plurality of sections of the selected content, wherein the structured text computer readable data structure comprises a JSON data structure that defines color values of selected colors, selected from the plurality of colors, for the set of the set of style parameter requests;

processing the blueprint against a first set of the plurality of smart blocks to generate, based on the color values, a set of scores for the smart blocks, wherein the processing comprises comparing the brand data to the set of style parameter requests of the plurality of structure blocks to generate the set of scores according to a degree of match between the brand data and the color values for the set of style parameter requests;

selecting a second set of smart blocks, from the subset of the plurality of structure blocks, from the plurality of smart blocks, using the set of scores, wherein the second set of smart blocks include a selected parameter style request having a selected color among the selected colors;

extracting, into a structured document defined in computer program code, suggested content from the second set of smart blocks by extracting a corresponding color value, from among the color values, for the selected color into the structured document; and generating the structured language electronic communication by combining the selected content in the selected template with the structured document, the structured document including the corresponding color value;

displaying a suggested content comprising the brand data, wherein the suggested content is generated from the second set of smart blocks and received from the server responsive to transmitting the selected content;

receiving the selected content from the suggested content; and generating the structured language electronic communication by combining the selected content with the second set of smart blocks.

* * * * *